(12) United States Patent
Strong et al.

(10) Patent No.: US 10,270,352 B2
(45) Date of Patent: Apr. 23, 2019

(54) ELECTRICAL ENERGY CONVERSION

(71) Applicant: Swansea University, Swansea (GB)

(72) Inventors: Laurence Alan Strong, Bristol (GB);
David Huw Davies, Bristol (GB);
Christopher Julian Travis,
Gloucestershire (GB)

(73) Assignee: Trameto Limited, Swansea (GB)

( * ) Notice: Subject to any disclaimer, the term of this patent is extended or adjusted under 35 U.S.C. 154(b) by 0 days.

(21) Appl. No.: 15/694,931

(22) Filed: Sep. 4, 2017

(65) Prior Publication Data

US 2018/0069481 A1 Mar. 8, 2018

(30) Foreign Application Priority Data

Sep. 6, 2016 (GB) ..................................... 615060.9

(51) Int. Cl.
*H02M 3/335* (2006.01)
*H02M 3/06* (2006.01)
(Continued)

(52) U.S. Cl.
CPC ......... *H02M 3/33576* (2013.01); *H02M 3/06* (2013.01); *H02M 3/155* (2013.01); *H02M 3/156* (2013.01); *Y02E 10/56* (2013.01)

(58) Field of Classification Search
CPC .... H02M 3/33576; H02M 3/06; H02M 3/155; H02M 3/156; Y02E 10/56
See application file for complete search history.

(56) References Cited

U.S. PATENT DOCUMENTS 4,665,357 A * 5/1987 Herbert .................. H01F 19/00
323/345
6,226,194 B1 5/2001 Bayer et al.
(Continued)

FOREIGN PATENT DOCUMENTS

EP 1047172 A2 10/2000

OTHER PUBLICATIONS

Hunt, Rowland, "UK Search Report", prepared for application No. 1615060.9, dated Feb. 10, 2017, 6 pages.
(Continued)

*Primary Examiner* — Jue Zhang
(74) *Attorney, Agent, or Firm* — Winstead PC (57) ABSTRACT

A switching circuit, electrical energy converter, power management unit and energy harvesting system are described. Such apparatus is applicable to energy harvesting applications which involve a variety of transducers, either singly or simultaneously. The transducers may, for example, be photovoltaic, thermoelectric, piezoelectric, or electrodynamic. The described converters operate to convert impedances, voltages and currents. They incorporate inductive energy transfer elements, which are magnetically coupled. Different combinations of these energy transfer elements are used to obtain different conversion ratios, which can be referred to as "gears". On the input side, having multiple gears enables easier and better matching to a wider variety of energy transducers. On the output side, it enables easier and better accommodation of a wider spread of energy storage voltages and of a wider variety of loads. Benefits include greater deployment flexibility, lower inventory cost, higher energy extraction, and higher conversion efficiency.

34 Claims, 6 Drawing Sheets

(51) Int. Cl.
*H02M 3/155* (2006.01)
*H02M 3/156* (2006.01)

(56) References Cited

U.S. PATENT DOCUMENTS

| | | |
|---|---|---|
| 6,242,970 B1 | 6/2001 | Grant et al. |
| 6,304,460 B1 * | 10/2001 | Cuk .................. H02M 1/34 |
| | | 363/131 |
| 2011/0062912 A1 | 3/2011 | Yang et al. |
| 2011/0260536 A1 | 10/2011 | Roy et al. |
| 2012/0032518 A1 | 2/2012 | Huang et al. |
| 2016/0096437 A1 | 4/2016 | Tripathi et al. |

OTHER PUBLICATIONS

Cheng et al., A Wide-Input-Wide-Output (WIWO) DC-DC Converter, IEEE Transactions on Power Electronics, 25(2), 2010.

* cited by examiner

ELECTRICAL ENERGY CONVERSION

The present invention relates to electrical energy conversion, and, in particular, to electronic circuits and associated techniques and systems for electrical energy conversion and power management in energy harvesting applications.

BACKGROUND OF THE INVENTION

Energy harvesting involves capturing ambient or background energy from the environment and converting it into usable electrical energy. This is typically stored and then used to power electrical loads such as electronic devices. In energy harvesting, energy transducers are used to bring the ambient energy into the electrical domain. For example, a thermoelectric generator makes use of a temperature difference, a piezoelectric transducer generates a voltage from mechanical strain, a photovoltaic cell converts light into electricity, and an electrodynamic transducer converts mechanical energy such as vibrations into electrical energy. The electrical energy from all such transducers can be stored in any suitable storage device, such as a capacitor, a supercapacitor, or a rechargeable battery, or can be stored in an appropriate group or combination of such storage devices.

Figure 1:
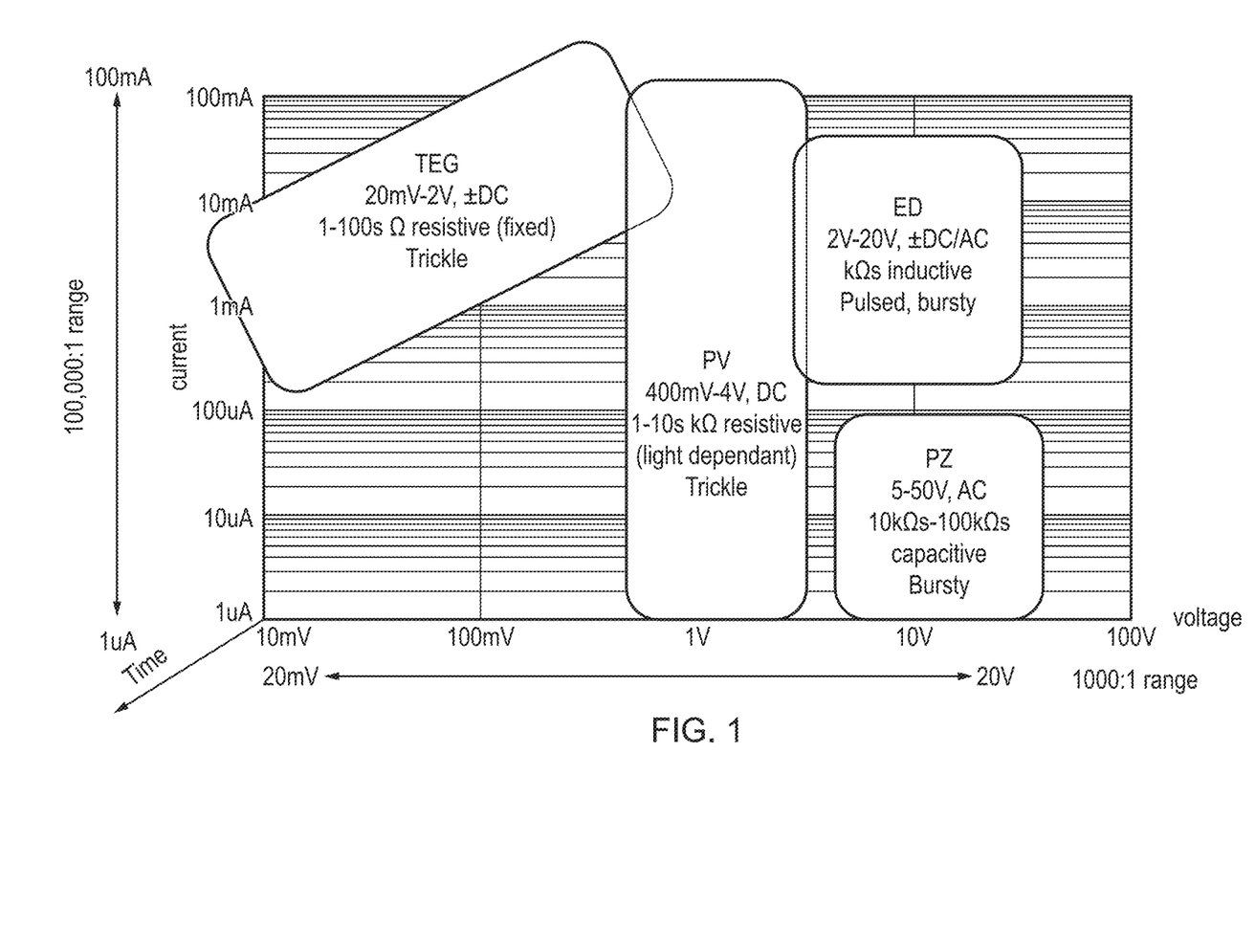
FIG. 1 illustrates outputs from different energy harvesting transducers.

The outputs of the various types of energy transducers have a wide range of different electrical characteristics. FIG. 1 of the accompanying drawings illustrates this for various types, by way of example. The characteristics described with reference to FIG. 1 are exemplary, and the values given are approximate. A thermoelectric generator (TEG) has a resistive output impedance, and generates a steady flow (a trickle) of direct-current electricity (DC) of either polarity, in a current range of 1 uA to 100 mA over a voltage range of 20 mV to 2V. A photovoltaic transducer (PV) also has a resistive output impedance, and generates a steady flow of DC electricity, in a current range of 1 uA to 100 mA over a voltage range of 400 mV to 4V, typically with a single polarity. An electrodynamic transducer (ED) has a mainly inductive output impedance, and typically generates energy in bursts or pulses, either as DC electricity of either polarity, or as alternating-current electricity (AC). Its output typically lies in a current range of 100 uA to 80 mA over a voltage range of 2V to 20V. A piezoelectric transducer (PZ) has a mainly capacitive output impedance, and generates AC electricity in bursts, in a current range of 1 uA to 100 uA over a voltage range of 5V to 50V.

As will be appreciated from FIG. 1, the wide range of power levels and output impedances of energy harvesting transducers presents a significant engineering challenge when interfacing to such devices. As a result, many of the existing energy-harvesting solutions are transducer-specific.

To extract the maximum amount of energy from a transducer, an energy converter that presents the transducer with a matched electrical impedance is used. In some cases, the maximum power point varies as the prevailing environmental conditions change. Existing energy converters, and power management units (PMUs) including such converters, for use in an energy harvesting application tend to focus on respective particular types of energy transducer, and provide targeted solutions for use with those particular types only. Operation with other types of energy transducer is often not possible, or involves accepting significant performance compromises.

Existing energy converters and PMUs typically have a single input for connection to a single energy transducer. Solutions with multiple inputs generally require that all the transducers are of a similar type, or have similar characteristics.

Some known energy converters claim operation with multiple transducer types but, in reality, provide an optimal solution with only a single transducer type. With other types of energy transducer, such converters are compromised. For example: Bridge rectifiers may be appropriate for PZ transducers, but they are inefficient or impractical for use with low-voltage DC sources; PZ transducers are relatively high voltage sources, and a corresponding voltage from PV would require many PV cells in series. None of the available energy converters and PMUs meet the need for harvesting energy from a variety of sources.

It is, therefore, desirable to provide energy converters, PMUs and associated systems and methods that address the drawbacks of existing products and solutions, and to provide a single PMU which properly supports multiple energy-harvesting transducers of different types and different power levels.

SUMMARY OF THE INVENTION

Aspects of the present invention are set out in the attached claims.

According to a first aspect of the present invention, there is provided a switching circuit for an electrical energy converter which includes magnetically coupled inductive energy transfer elements, the switching circuit comprising an input connection for receiving input electrical energy from an electrical energy source; an output connection for delivering output electrical energy to an energy storage device or load; transfer connections adapted for connection to first and second magnetically coupled inductive energy transfer elements; and switching means connected with the input connection, output connection, and transfer connections, and adapted for connection to such first and second magnetically coupled inductive energy transfer elements via the transfer connections, the switching means being operable to route received electrical energy from the input connection to the output connection via the transfer connections, wherein the switching means have a plurality of switching sequences for such routing of such electrical energy, each of the switching sequences being operable to route received electrical energy via a different combination of the transfer connections.

In one example, each switching sequence has an energising switch configuration for routing the input electrical energy along an energising current path which includes at least one of the energy transfer elements, and a de-energising switch configuration for routing the output electrical energy along a de-energising current path which includes at least one of the energy transfer elements.

According to a second aspect of the present invention, there is provided an electrical energy converter for use in an energy harvesting system, the converter comprising a first inductive energy transfer element; a second inductive energy transfer element magnetically coupled with the first inductive energy transfer element; and a switching circuit connected with the energy transfer elements, wherein the switching circuit comprises an input connection for receiving input electrical energy from an electrical energy source; an output connection for delivering output electrical energy to an energy storage device or load; transfer connections connected with the first and second energy transfer elements; and switching means connected with the input connection, output connection, and transfer connections, and operable to route received electrical energy from the input connection to the output connection via the transfer connections and energy transfer elements, wherein the switching means have a plurality of switching sequences for such routing of such electrical energy, each of the switching sequences being operable to route the received electrical energy via a different combination of the energy transfer elements.

In one example, each switching sequence has an energising switch configuration for routing the input electrical energy to at least one of the energy transfer elements, and a de-energising switch configuration for routing the output electrical energy from at least one of the energy transfer elements.

In one example, in at least one of the switching sequences, a selected one of the transfer connections is included in both the energising current path and in the de-energising current path.

In one example, in at least one of the switching sequences, a selected one of the transfer connections is included in only one of the energising current path and the de-energising current path.

In one example, the switching means is configurable to provide different ranges of input impedance and/or different ranges of voltage gain.

One example embodiment further comprises a control unit operable to configure the switching means in dependence upon an electrical energy source connected to the input connection.

In one example, the input connection includes an input node and a ground node, the output connection includes an output node and the ground node, and the transfer connections include first and second nodes and an intermediate node, the first node being for connection to a first terminal of a first energy transfer element, the intermediate node being for connection to a second terminal of such a first energy transfer element and to a first terminal of a second energy transfer element, and the second node being for connection to a second terminal of such a second energy transfer element.

In one example, the switching means comprises a first switch connected between the input node and the intermediate node; a second switch connected between the input node and the first node; a third switch connected between the first node and the ground node; a fourth switch connected between the intermediate node and the ground node; a fifth switch connected between the intermediate node and the output node; a sixth switch connected between the second node and the output node; and a seventh switch connected between the second node and the ground node.

One example embodiment further comprises a plurality of such input connections for receiving respective electrical energy inputs from respective electrical energy sources.

One example embodiment further comprises a plurality of such output connections for connection to respective destinations, at least one of which destinations includes an energy storage device or load.

In one example, the switching means includes at least one electronic switch, such as a field effect transistor. In one such example, the switching means is provided by a plurality of field effect transistors.

In one example, the input connection and the output connection are galvanically connected with one another.

In one example converter, the first and second energy transfer elements are provided by a single inductive component.

According to a third aspect of the present invention, there is provided a power management unit for energy harvesting, the power management unit including an electrical energy converter according to the second aspect of the present invention.

According to a third aspect of the present invention, there is provided an energy harvesting system comprising an electrical energy converter according to the second aspect of the present invention; an electrical energy source connected to provide an input to the electrical switching converter; and an energy storage device or load connected to receive an electrical output from the electrical switching converter.

One example embodiment of such a system further comprises a plurality of such energy sources.

One example embodiment of such a system further comprises a plurality of such energy storage devices or loads.

DETAILED DESCRIPTION

As described with reference to FIG. 1, the wide range of electrical characteristics of energy harvesting transducers presents a significant challenge to the effective extraction and conversion of energy from such transducers. The need to accommodate a spread of voltages at energy storage devices and a variety of electrical loads is also challenging.

Figure 2:
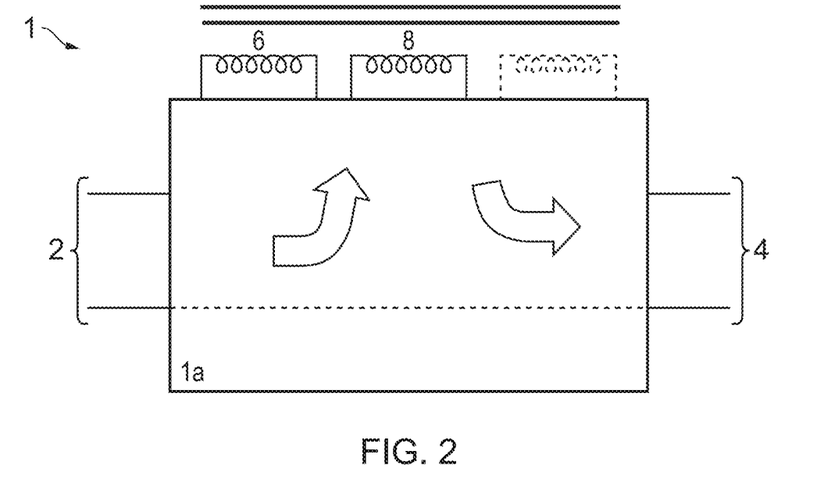
FIG. 2 illustrates principles of the present invention in a general form.

FIG. 2 illustrates schematically an electrical energy converter 1 embodying the principles of the present invention. The energy converter 1 is operable to convert voltages and currents of input electrical energy, and to present an appropriate impedance for the energy transducer being used. The converter 1 comprises a switching circuit 1a, which may be an integrated circuit fabricated as a single chip, and at least two energy transfer elements 6, 8 electrically connected to the switching circuit 1a by respective transfer connections. The energy transfer elements 6, 8 are provided by magnetically coupled inductive elements, and may be provided by separate inductor components, which are preferably proximate, or by a single inductive component such as a tapped coil inductor.

The converter 1 includes at least one input connection 2 for receiving electrical energy, and at least one output connection 4 for providing output electrical energy. The switching circuit 1a includes a plurality of electronic switches, which may be field-effect transistors.

The converter 1 operates to route electrical energy from the input connection or connections 2 to the output connection or connections 4 via the energy transfer elements 6,8. Electrical energy is transferred by repeatedly applying a sequence of predetermined configurations of the electronic switches. Typically, in each sequence, a first switch configuration routes a portion of electrical energy from an input by connecting that input to one or more of the energy transfer elements 6,8. The energy is at least partially distributed to different energy transfer elements by magnetic coupling between the transfer elements. A second switch configuration routes the energy to the output connection 4 by connecting an output from one or more of the energy transfer elements to the output connection 4.

The converter 1 has a plurality of switching sequences available. Each switching sequence routes the energy via a different energy transfer element or via a different combination of such elements. The different switching sequences provide the converter 1 with different conversion ratios, which can be referred to as "gears". Such a converter 1 may be known as a "geared" converter. The converter 1 is operable to change between different switching sequences in a dynamic manner.

On the input side, the availability of multiple gears enables easier and better electrical matching to a wider variety of energy transducers. On the output side, the availability of multiple gears enables easier and better accommodation of a wider spread of energy storage voltages and of a wider variety of loads.

Geared converters embodying the principles of the present invention are able to provide power management units that can convert a wide range of electrical energy inputs to electrical energy outputs within desired voltage ranges suitable for energy storage devices. For example, embodiments can receive inputs having currents in the range 1 uA to 100 mA and voltages in the range 20 mV to 20V, with a transducer resistive/inductive/capacitive impedance of single-digit ohms to thousands of ohms. Embodiments can also provide appropriate outputs from steady inputs, from pulsating inputs, and burst-type inputs.

Figure 3:
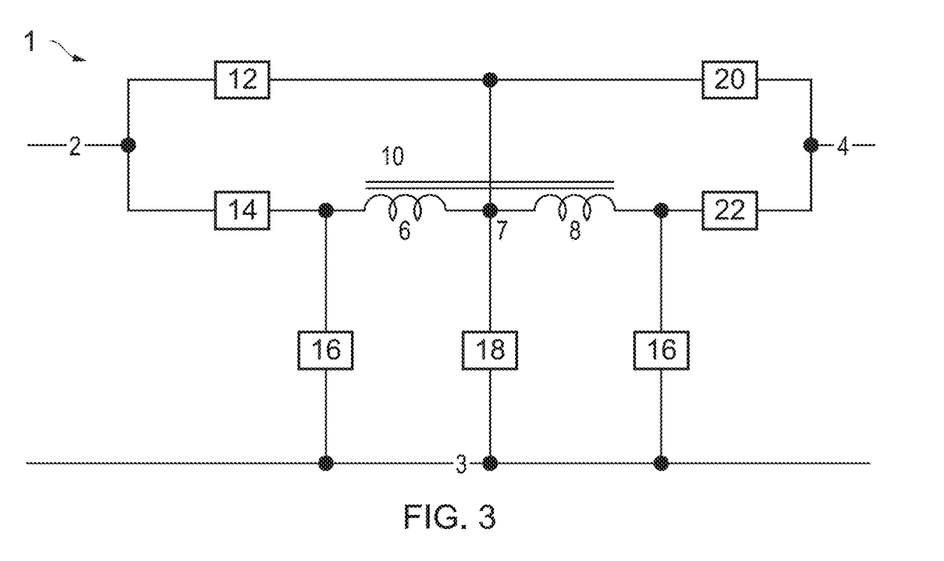
FIG. 3 illustrates a particular embodiment of the present invention.

FIG. 3 illustrates an exemplary circuit design for a converter embodying an aspect of the present invention. The circuit 1 of FIG. 3 provides a switching converter for converting an output of an energy transducer to a desired voltage range. The circuit 1 has an input connection 2 and ground node 3 to which an output of an energy transducer is connected. The circuit 1 has an output connection 4.

First and second magnetically-coupled inductive energy transfer elements 6 and 8 are connected in series between the input connection 2 and the output connection 4. In one example, the first and second energy transfer elements form a single inductive component 10, which may, for example, be provided by a tapped inductor. The first energy transfer element 6 has a first end for switched connection with the input connection 2, and a second end connected with an intermediate node 7. The second energy transfer element 8 has a first end connected with the intermediate node 7, and hence with the second end of the first energy transfer element 6. The second energy transfer element 8 has a second end for switched connection with the output connection 4.

A plurality of switches is provided in order to route electrical energy from a connected energy transducer through the converter 1. A first switch 12 is connected between the input connection 2 and the intermediate node 7. A second switch 14 is connected between the input connection 2 and the first end of the first energy transfer element 6. A third switch 16 is connected between the first end of the first inductive element and ground 3. A fourth switch 18 is connected between the intermediate node 7 and ground 3. A fifth switch 20 is connected between the intermediate node 7 and the output connection 4. A sixth switch 22 is connected between the second end of the second energy transfer element 8 and the output connection 4. A seventh switch 24 is connected between the second end of the second energy transfer element 8 and ground 3.

Each of the first to seventh switches may be provided by any appropriate controllable electronic switching device, for example by a field effect transistor (FET). Each switch has two connections, and is operable to electrically connect or isolate those connections. In the following description, a switch is described as being in an "on" state when it has electrically connected its two connections, and in an "off" state when it has isolated those connections. By providing an appropriate combination of on and off states, currents can be routed appropriately through the first and second energy transfer elements 6 and 8.

By energizing combinations of one or both energy transfer elements 6 and 8, and/or then de-energizing combinations of one or both energy transfer elements 6 and 8, the converter 1 can provide different ratios or 'gears' of conversion, for any given switching frequency and duty cycle. Similarly, it can provide different impedance ratios, and hence can present different impedances to the energy transducer. As such, the converter 1 provides a variable buck-boost DC-DC converter. As is well known, buck-boost converters can be operated in buck mode, buck-boost mode, or boost mode. The converter is able to change between different switching sequences in a dynamic manner, in order to react to the type of power source being connected to the input.

In one preferred example, the energy transfer elements are provided by coils having different respective numbers of turns. The turns ratio advantage familiar from single-path transformer-based converters complements the advantages that derive from having multiple gears.

When an energy transfer element is in the energization path but absent from the de-energization path, the circuit designer must address the consequences of imperfect magnetic coupling. Many approaches are known. Components for ameliorating such leakage-inductance effects are omitted from FIG. 3 for clarity.

Figure 4:
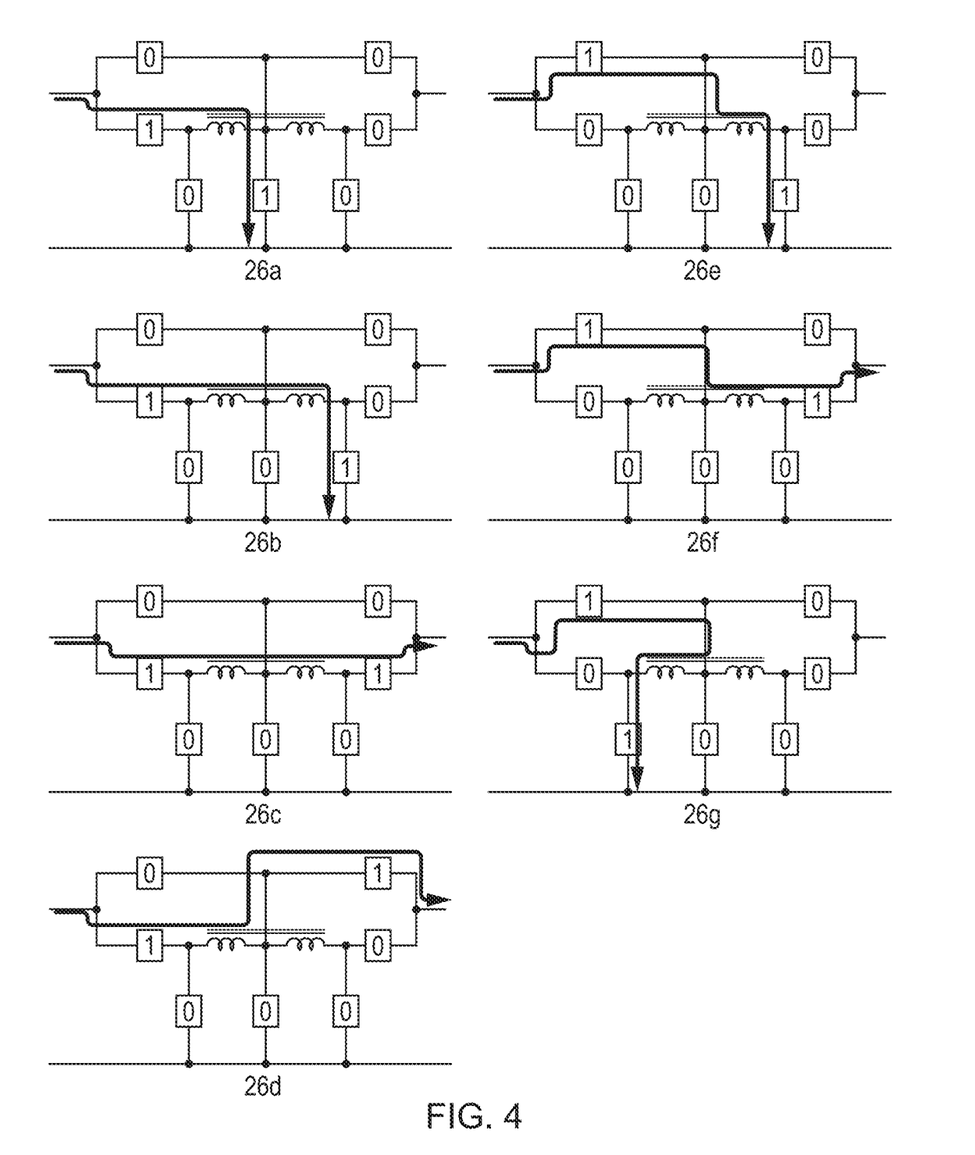
FIG. 4 illustrates possible energization current paths through the circuit of FIG. 2.

FIG. 4 illustrates various paths for energizing one or both of the first and second energy transfer elements 6 and 8. In FIG. 4, a switch in the on state is indicated by a '1', and in the off state by a '0'. In each path, two of the plurality of switches are on. The various exemplary energizing paths and corresponding switch configurations are set out in the table below. Paths 26c, 26d and 26f are only applicable if the input voltage is larger than the output voltage:

| Path | On switches | Energy Transfer Elements | Current Path |
|---|---|---|---|
| 26a | $2^{nd}$, $4^{th}$ (14, 18) | $1^{st}$ (6) | Input (2) to ground (3) |
| 26b | $2^{nd}$, $7^{th}$ (14, 24) | $1^{st}$, $2^{nd}$ (6, 8) | Input (2) to ground (3) |
| 26c | $2^{nd}$, $6^{th}$ (14, 22) | $1^{st}$, $2^{nd}$ (6, 8) | Input (2) to output (4) |
| 26d | $2^{nd}$, $5^{th}$ (14, 20) | $1^{st}$ (6) | Input (2) to output (4) |
| 26e | $1^{st}$, $7^{th}$ (12, 24) | $2^{nd}$ (8) | Input (2) to ground (3) |
| 26f | $1^{st}$, $6^{th}$ (12, 22) | $2^{nd}$ (8) | Input (2) to output (4) |
| 26g | $1^{st}$, $3^{rd}$ (12, 16) | $1^{st}$ (6) | Input (2) to ground (3) |

Figure 5:
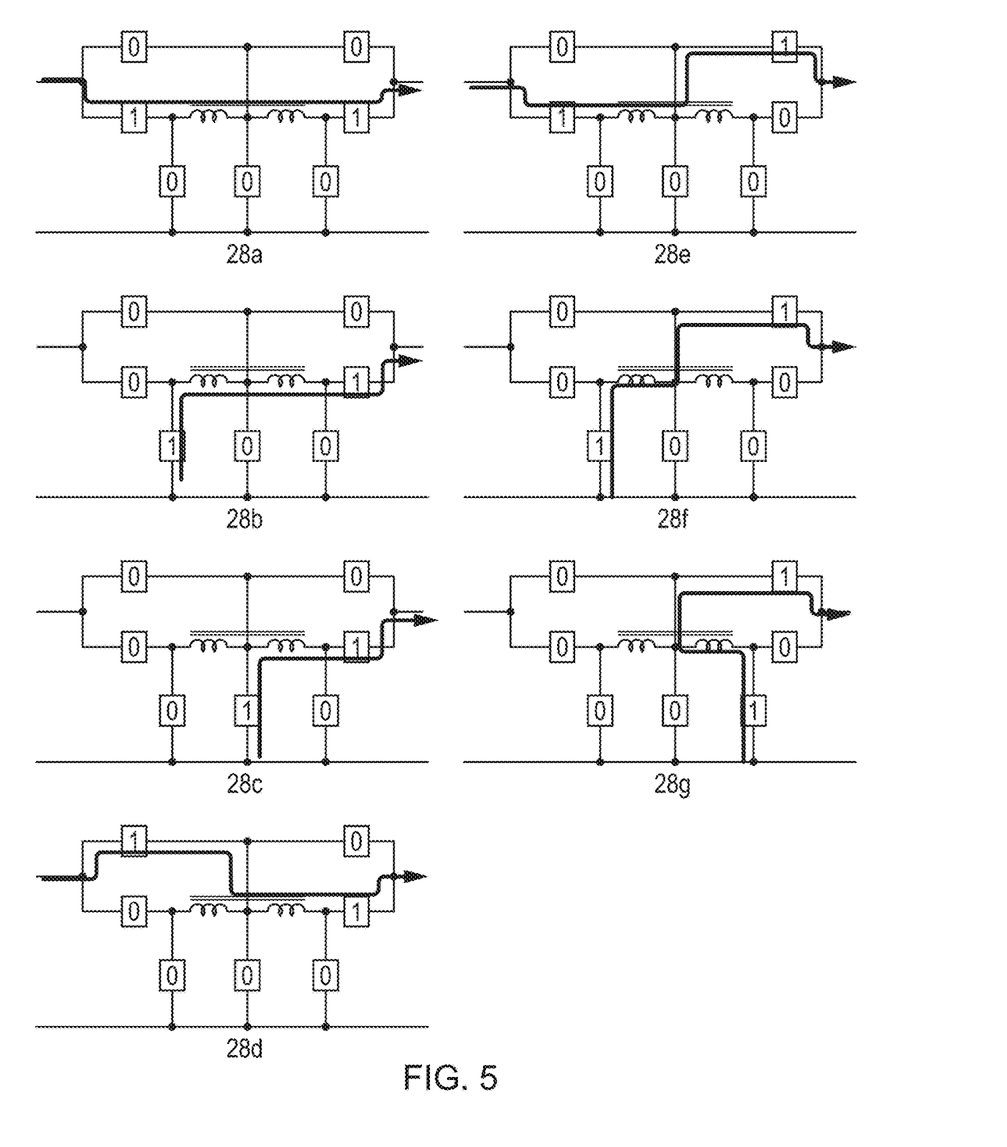
FIG. 5 illustrates possible de-energization current paths through the circuit of FIG. 2.

FIG. 5 illustrates various paths for de-energizing one or both of the first and second inductive elements 6 and 8. As in FIG. 4, a switch in the on state is indicated by a '1', and in the off state by a '0'. In each path, two of the plurality of switches are on. The various exemplary de-energizing paths and corresponding switch configurations are set out in the table below. Paths 28a, 28d and 28e are only applicable if the output voltage is larger than the input voltage:

| Path | On switches | Energy Transfer Elements | Current Path |
| --- | --- | --- | --- |
| 28a | $2^{nd}$, $6^{th}$ (14, 22) | $1^{st}$, $2^{nd}$ (6, 8) | Input (2) to output (4) |
| 28b | 3rd, $6^{th}$ (16, 22) | $1^{st}$, $2^{nd}$ (6, 8) | Ground (3) to output (4) |
| 28c | $4^{th}$, $6^{th}$ (18, 22) | $2^{nd}$ (8) | Ground (3) to output (4) |
| 28d | $1^{st}$, $6^{th}$ (12, 22) | $2^{nd}$ (8) | Input (2) to output (4) |
| 28e | $2^{nd}$, $5^{th}$ (14, 20) | $1^{st}$ (6) | Input (2) to output (4) |
| 28f | $3^{rd}$, $5^{th}$ (16, 20) | $1^{st}$ (6) | Ground (3) to output (4) |
| 28g | $7^{th}$, $5^{th}$ (24, 20) | $2^{nd}$ (8) | Ground (3) to output (4) |

In accordance with the known principles of a buck-boost converter, which makes use of inductive components for the energy transfer elements, while energizing, the inductive component accumulates energy, and while de-energizing, this energy (less losses) is recovered. The circuit may be operated in a discontinuous conduction mode (DCM). Some degree of control can be exercised over the voltage/current/impedance conversion ratios via the switching frequency and duty cycle. However, that degree of control is often insufficient. By choosing different energization paths and/or de-energization paths in the exemplary circuit of FIG. 3, significantly more control is obtained.

In one example embodiment, the following switching sequences provide different respective gears for the converter:

S1: energisation current path 26e, followed by de-energisation current path 28f.

S2: energisation current path 26a, followed by de-energisation current path 28f.

S3: energisation current path 26e, followed by de-energisation current path 28c.

S4: energisation current path 26a, followed by de-energisation current path 28c.

These switching sequences all implement buck-boost converter functionality. However, for the same switching times, these four switching sequences can deliver quite different characteristics.

By way of explanation, assume that the energy transfer elements 6 and 8 are inductive elements which are magnetically coupled with a turns ratio of 1:N.

Then, comparatively, the switching sequences S1, S2, S3 & S4 will provide respective input:output voltage gains of N:1, 1:1, N:N and 1:N. Similarly, the switching sequences S1, S2, S3 & S4 will provide respective relative input:output impedance ratios of $N^2$:1, 1:1, $N^2$:$N^2$ & 1:$N^2$.

By selecting an appropriate switching sequence, or 'gear', the converter 1 is able to provide different input-to-output voltage gain ratios and present different impedances to the input and/or output. Furthermore, by varying switching times, ranges of voltage gains and impedance ratios are available, which, with appropriate selection of N can be made overlapping. The converter is able to change between different switching sequences in a dynamic manner, in order to react to the type of power source being connected to the input.

It will be readily apparent that additional energy storage elements and associated switches, where needed, may be provided in a converter embodying the principles of the invention.

Figure 6:
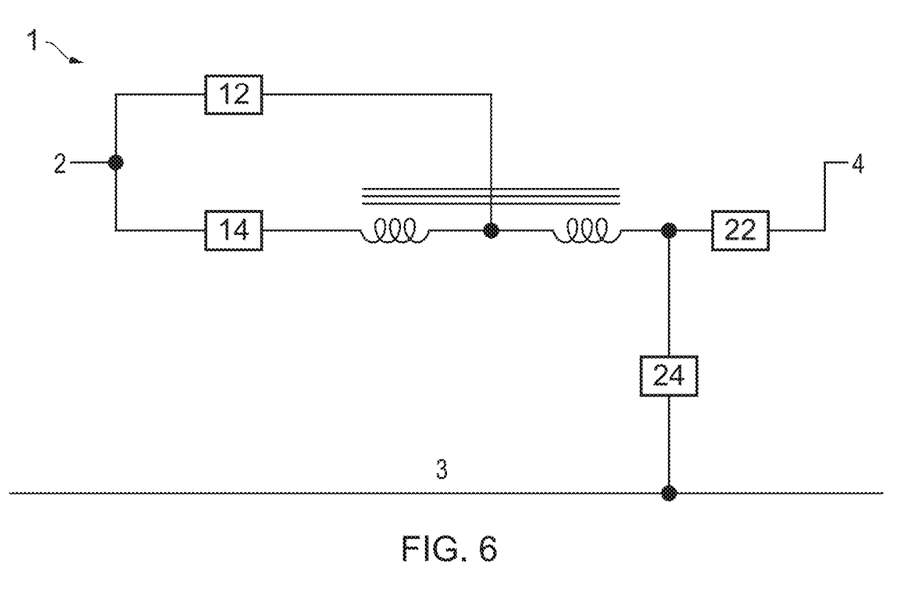
FIG. 6 illustrates another embodiment of the present invention.

Many other circuit topologies embodying the principles of the present invention are possible. For example, FIG. 6 shows a variation of the converter of FIG. 3 which is a dual gear boost converter. First and second switches 12 and 14 are connected between the input connection 2 and respective ends of a first energy storage element. Third and fourth switches 22 and 24 are connected between a second end of a second energy storage element and the output connection 4 and ground 3 respectively.

The first to fourth switches 12, 14, 22, 24 have a plurality of switching combinations, to provide different respective routes for electrical signals supplied to the input connection to the output connection, in a manner similar to that described with reference to FIG. 3.

Similarly, although the exemplary embodiments described above do not provide galvanic isolation between the input and output connections, such isolation is possible within the principles of the present invention.

Switching converter circuits and power management units according to the present invention—and their associated systems and methods—help to enable universal multi-mode and multi-node energy harvesting.

The invention claimed is:

1. A switching circuit for an electrical energy converter, which converter includes an inductive component comprising magnetically coupled first and second inductive energy transfer elements, the switching circuit comprising:
   an input connection for receiving input electrical energy from an electrical energy source;
   an output connection for delivering output electrical energy to an energy storage device or load;
   transfer connections adapted for connection to the first and second magnetically coupled inductive energy transfer elements; and
   switching means connected with the input connection, output connection, and transfer connections, and adapted for connection to the first and second magnetically coupled inductive energy transfer elements via the transfer connections, the switching means being operable to route received electrical energy from the input connection to the output connection via the transfer connections, wherein the switching means have a plurality of switching sequences for such routing of such electrical energy, each sequence of the plurality of switching sequences being operable to route received electrical energy via a different combination of the transfer connections;
   wherein each switching sequence has an energising switch configuration for routing the input electrical energy along an energising current path which includes at least one of the transfer connections whereby the energy in the inductive component increases, and a de-energising switch configuration for routing the output electrical energy along a de-energising current path which includes at least one of the transfer connections whereby the energy in the inductive component decreases;
   wherein each of the switching sequences is operable to route received electrical energy via a different combination of said energising and de-energising current paths;
   wherein said energising and de-energising current paths together comprise at least one of:
      a plurality of different current paths which each include the input connection but not the output connection;
      a plurality of different current paths which each include the output connection but not the input connection; or
      a plurality of different current paths which each include the input connection and the output connection.

2. A circuit as claimed in claim 1, wherein the switching means are configurable to provide different ranges of input impedance and/or different ranges of voltage gain.

3. A circuit as claimed in claim 1, further comprising a control unit operable to configure the switching means in dependence upon an electrical energy source connected to the input connection.

4. A circuit as claimed in claim 1, wherein the input connection includes an input node and a ground node, the output connection includes an output node and the ground node, and the transfer connections include first and second nodes and an intermediate node, the first node being adapted for connection to a first terminal of the first energy transfer element, the intermediate node being for connection to a second terminal of the first energy transfer element and to a first terminal of the second energy transfer element, and the second node being adapted for connection to a second terminal of the second energy transfer element.

5. A circuit as claimed in claim 4, wherein the switching means comprises:
a first switch connected between the input node and the intermediate node;
a second switch connected between the input node and the first node;
a third switch connected between the second node and the output node; and
a fourth switch connected between the second node and the ground node.

6. A circuit as claimed in claim 1, further comprising a plurality of such input connections for receiving respective electrical energy inputs from respective electrical energy sources.

7. A circuit as claimed in claim 1, further comprising a plurality of such output connections for connection to respective destinations, at least one of which destinations includes an energy storage device or load.

8. A circuit as claimed in claim 1, wherein the switching means are provided by a plurality of field effect transistors.

9. A circuit as claimed in claim 1, wherein the input connection and the output connection are galvanically connected with one another.

10. A circuit as claimed in claim 1, in the form of an integrated circuit fabricated in a semiconductor process as an integrated circuit.

11. A circuit as claimed in claim 1, wherein the first and second magnetically-coupled inductive energy transfer elements are connected in series.

12. A circuit as claimed in claim 1, wherein at least one of said current paths passes through two or more of said transfer connections in series.

13. A circuit as claimed in claim 1, comprising a plurality of different energising current paths which each include the input connection but not the output connection.

14. A circuit as claimed in claim 1, comprising three or more transfer connections for connection to three or more magnetically coupled energy transfer elements.

15. A circuit as claimed in claim 1, wherein the circuit is configured to operate in a discontinuous conduction mode.

16. A circuit as claimed in claim 1, wherein the energy transfer elements are provided by coils having different respective numbers of turns.

17. An electrical energy converter, the converter comprising:
a first inductive energy transfer element;
a second inductive energy transfer element magnetically coupled with the first inductive energy transfer element, whereby the first and second energy transfer elements are provided by a single inductive component; and a switching circuit connected with the energy transfer elements, wherein the switching circuit comprises:
an input connection for receiving input electrical energy from an electrical energy source;
an output connection for delivering output electrical energy to an energy storage device or load; and
switching means connected with the input connection, output connection, and energy transfer elements, and operable to route received electrical energy from the input connection to the output connection via the energy transfer elements,
wherein the switching means have a plurality of switching sequences for such routing of such electrical energy, each sequence of the plurality of switching sequences comprising:
an energising switch configuration for routing the input electrical energy along an energising current path which includes at least one of the energy transfer elements whereby the energy in the inductive component increases, and a de-energising switch configuration for routing the output electrical energy along a de-energising current path which includes at least one of the energy transfer elements, whereby the energy in the inductive component decreases;
wherein each of the switching sequences is operable to route the received electrical energy via a different combination of said energising and de-energising current paths;
wherein said energising and de-energising current paths together comprise at least one of:
a plurality of different current paths which each include the input connection but not the output connection;
a plurality of different current paths which each include the output connection but not the input connection; or
a plurality of different current paths which each include the input connection and the output connection.

18. A converter as claimed in claim 17, wherein the switching means is configurable to provide different ranges of input impedance and/or different ranges of voltage gain.

19. A converter as claimed in claim 17, further comprising a control unit operable to configure the switching means in dependence upon an electrical energy source connected to the input connection.

20. A converter as claimed in claim 17, wherein the input connection includes an input node and a ground node, the output connection includes an output node and the ground node, and the switching means include first and second nodes and an intermediate node, the first node being for connection to a first terminal of a first energy transfer element, the intermediate node being for connection to a second terminal of the first energy transfer element and to a first terminal of the second energy transfer element, and the second node being for connection to a second terminal of such a second energy transfer element.

21. A converter as claimed in claim 20, wherein the switching means comprises:
a first switch connected between the input node and the intermediate node;
a second switch connected between the input node and the first node;
a three switch connected between the second node and the output node; and
a four switch connected between the second node and the ground node.

22. A converter as claimed in claim 17, further comprising a plurality of such input connections for receiving respective electrical energy inputs from respective electrical energy sources.

23. A converter as claimed in claim 17, further comprising a plurality of such output connections for connection to respective destinations, at least one of which destinations includes an energy storage device or load.

24. A converter as claimed in claim 17, wherein the switching means is provided by a plurality of field effect transistors.

25. A converter as claimed in claim 17, wherein the input connection and the output connection are galvanically connected with one another.

26. A power management unit comprising an electrical energy converter as claimed in claim 17.

27. An energy harvesting system comprising:
   an electrical energy converter as claimed in claim 17;
   an electrical energy source connected to provide an input to the electrical energy converter; and
   an energy storage device or load connected to receive an electrical output from the electrical energy converter.

28. A circuit as claimed in claim 17, wherein the first and second magnetically-coupled inductive energy transfer elements are connected in series.

29. A circuit as claimed in claim 17, wherein at least one of said current paths passes through two or more of said energy transfer elements in series.

30. A circuit as claimed in claim 17, comprising a plurality of different energising current paths which each include the input connection but not the output connection.

31. A circuit as claimed in claim 17, comprising three or more energy transfer elements for connection to three or more magnetically coupled energy transfer elements.

32. A circuit as claimed in claim 17, wherein the circuit is configured to operate in a discontinuous conduction mode.

33. A circuit as claimed in claim 17, wherein the energy transfer elements are provided by coils having different respective numbers of turns.

34. A converter as claimed in claim 17, wherein the inductive component is a tapped inductor.

* * * * *